United States Patent [19]

Shimasaki

[11] Patent Number: 4,758,035
[45] Date of Patent: Jul. 19, 1988

[54] SELF-GRIPPING REACHER

[75] Inventor: Kevin W. Shimasaki, Mesa, Ariz.

[73] Assignee: Harrington Arthritis Research Center, Phoenix, Ariz.

[21] Appl. No.: 42,176

[22] Filed: Apr. 24, 1987

[51] Int. Cl.⁴ .............................................. B25J 1/02
[52] U.S. Cl. .................................................. 294/19.1
[58] Field of Search ................... 294/19.1, 22, 23, 25, 294/26, 50.8, 50.9, 57, 58, 115; 224/218, 219, 221, 222, 267

[56] References Cited

U.S. PATENT DOCUMENTS 3,986,743 10/1976 Bjurling et al. .
4,231,603 11/1980 van Zelm .
4,374,600 2/1983 van Zelm .
4,613,179 9/1986 van Zelm ............................ 294/19.1

FOREIGN PATENT DOCUMENTS 983019 12/1982 U.S.S.R. ............................... 294/19.1

OTHER PUBLICATIONS

Excerpt from *Reaching* brochure, Vee-Zee Angle Arm Reacher (1 page).
"Omnigrip Reachers", Apr. 1986, vol. 40, No. 4. (1 page).
Excerpt from *Reachers* brochure, E-Zee Reachers. (1 page p. 46).
*VA Rer. & DS Progress Reports*, "No Grasp Reacher", p. 172.

Primary Examiner—James B. Marbert
Attorney, Agent, or Firm—Wood, Herron & Evans

[57] ABSTRACT

A gripping and reaching device for persons with wrist or grip disabilities comprising a one-piece forearm brace which pivotally mounts an axially aligned extension arm having a pair of opposed object engaging gripping elements at its end. The gripper elements are brought into initial contact with the object located therebetween by hand operation of a trigger mounted to the brace. Upon lifting of the object, the gripping elements are further tightened about the object by a cable linkage which is tensioned in response to pivotal movement of the extension arm with a force corresponding to the weight of the object.

9 Claims, 3 Drawing Sheets

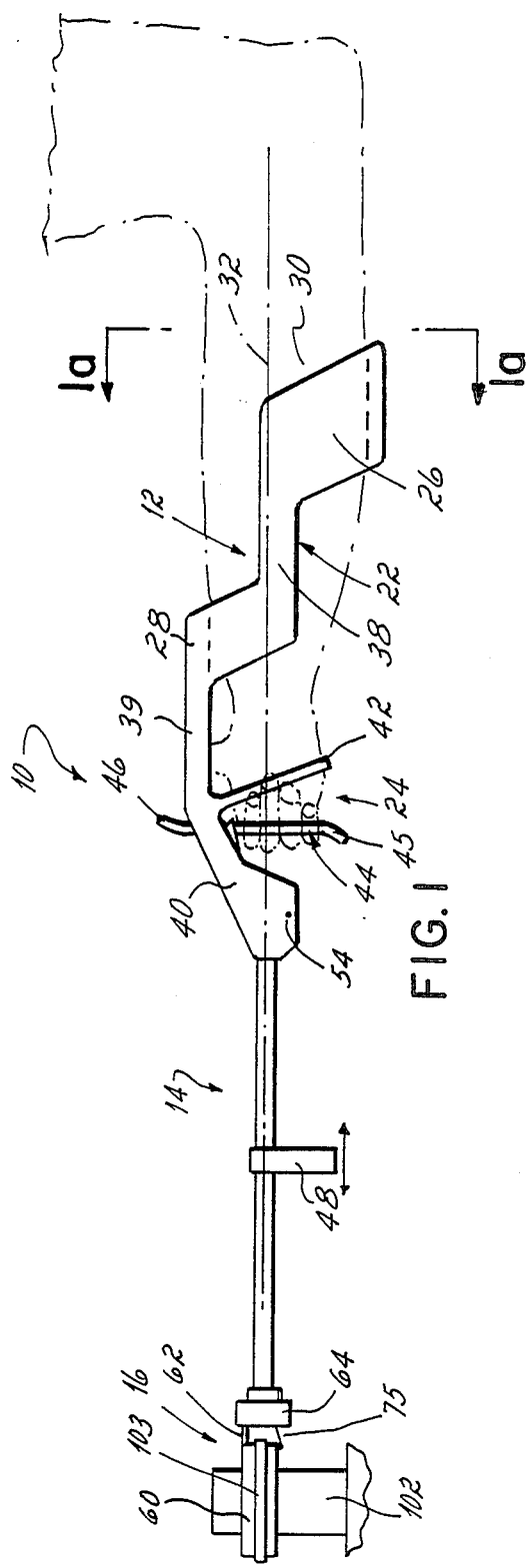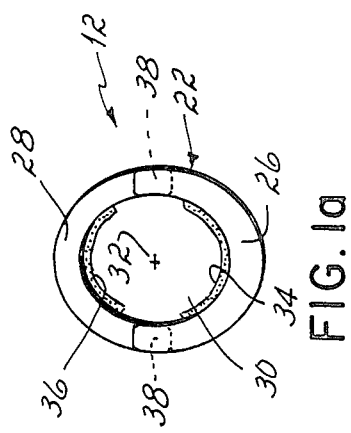

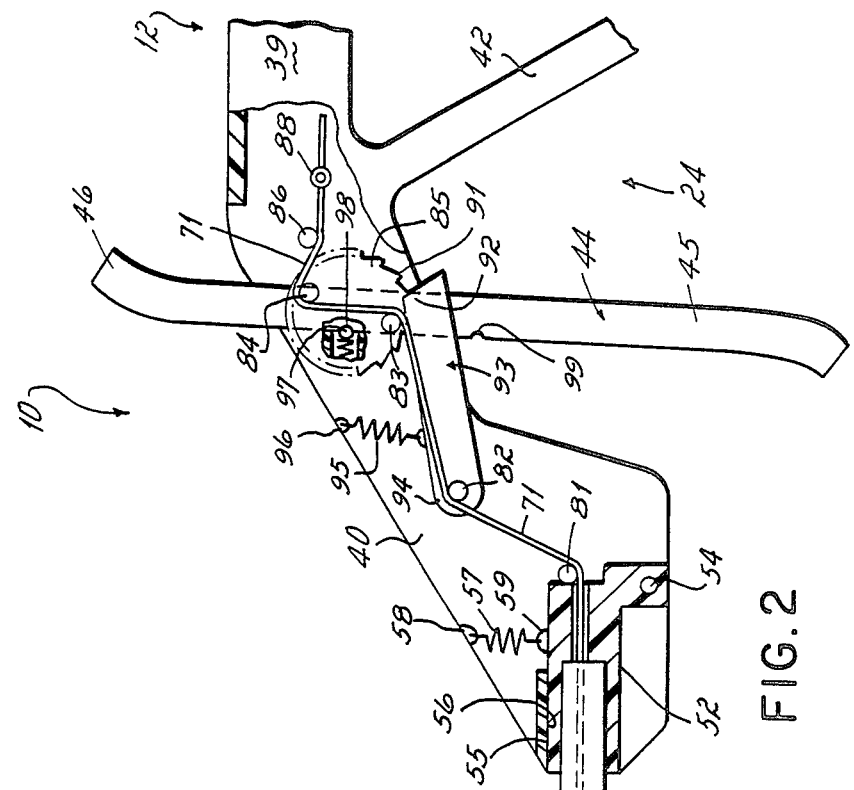
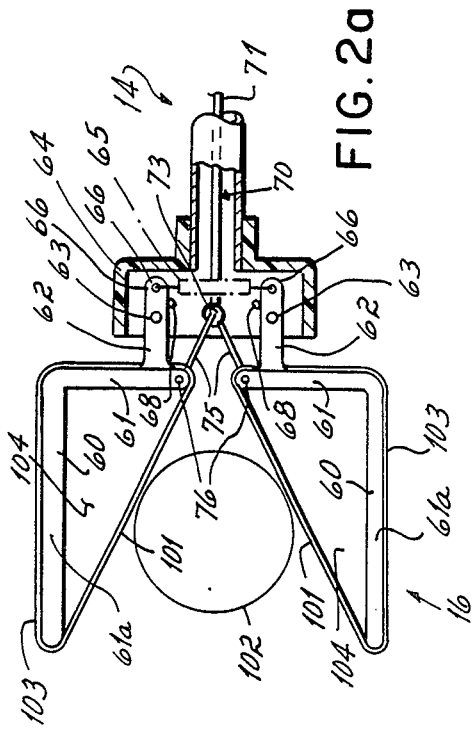
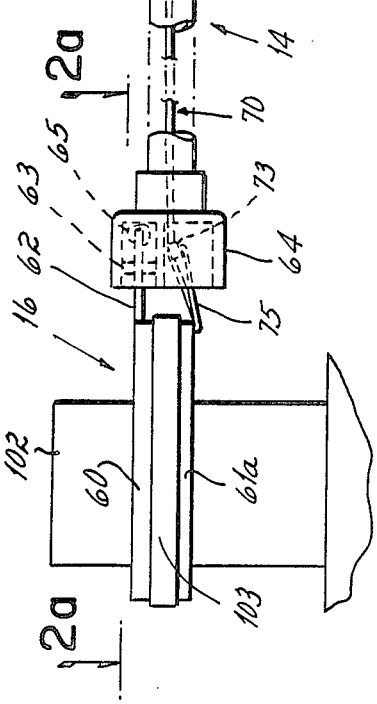
FIG. 2
FIG. 2a

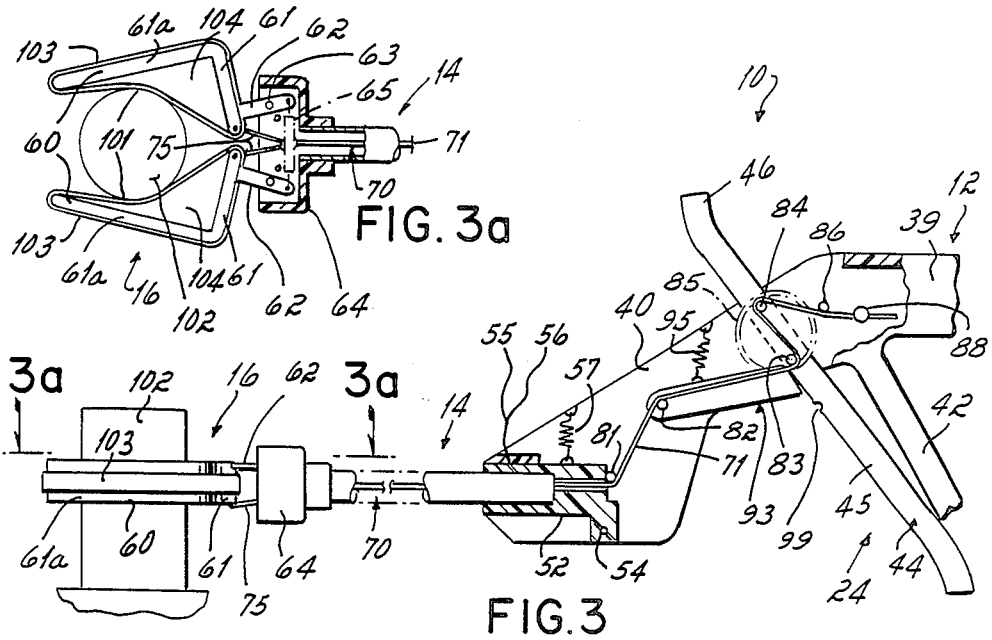
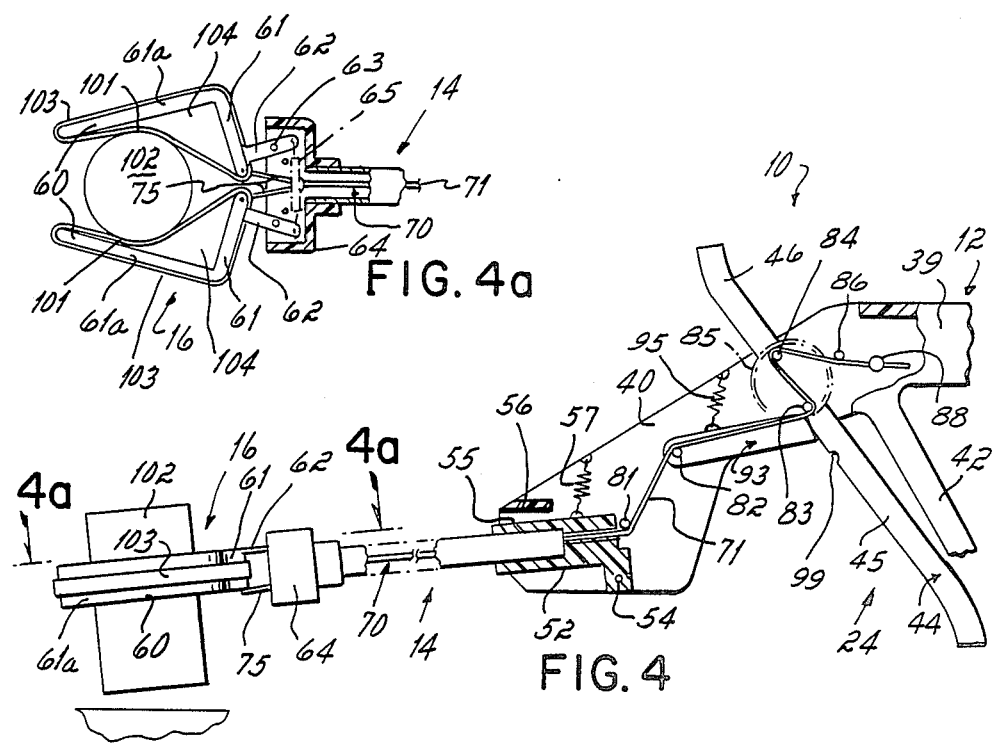

SELF-GRIPPING REACHER

BACKGROUND OF THE INVENTION

The present invention relates to devices for aiding handicapped persons by extending their reaching and gripping abilities. More particularly, the present invention relates to gripping and reaching devices for use by persons with grip and wrist disabilities in reaching and lifting objects.

Persons suffering with hip, back or lower extremity injury often lack the ability to grasp objects beyond the restricted range of that person's motion. To assist persons with such handicaps, the prior art has provided mechanical reaching devices which operate to extend the reach and improve the ability of the user to grip objects. Reaching devices generally comprise a support to mount the device on the forearm and wrist or hand, and a trigger mechanism connected by a cable to a pair of pivotal gripper jaws. The user pulls the trigger to close the gripper jaws about an object to be lifted and to control the amount of force applied to the object. Once the object is gripped in this manner, the user then moves his or her forearm to lift the object and place it at a desired location. See, for example, U.S. Pat. Nos. 4,374,600 to van Zelm and 3,986,743 to Bjurling et al.

Benefiting from the use of such reaching devices are persons whose handicaps restrict the person's ability to bend or reach for objects, or to readily move toward the objects which the person must lift. Such handicaps are frequently suffered by persons with arthritis or similarly disabling injuries or diseases. These types of conditions result in a weakening of the user's hand or wrist, thus reducing the person's ability to grasp and lift objects of even moderate weight.

One problem with prior art reaching devices is that the force applied by the gripper jaws to the object to be lifted is dependent upon the strength of the user's grip in operating the trigger mechanism of the device. Unless the user has retained sufficient strength in the wrist and hand, or the object to be lifted is light, it is often difficult of the user to exert sufficient grasping force on the trigger mechanism to hold the object so that it can be lifted and carried.

In order to increase the reach of the user, an extension arm is provided in prior art reacher devices between the gripping jaws and the structure which mounts the device of the forearm and wrist of the user. When an object is picked up by the gripper jaws at one end of the extension arm, a moment in the form of a bending force is produced at the opposite end thereof in the area of the hand and wrist. Another problem with prior art reaching devices of the type described above is that this bending force at the hand and wrist of the user is often substantially greater than the weight of the object to be lifted. The user must therefore not only counteract the bending force produced by the mass of the object with his or her wrist, hand and fingers, but also operate the trigger mechanism at the same time to control the amount of gripping force applied to the object being lifted.

A still further problem with reacher devices of the prior art is that they have been designed with little or no regard for the balance of the device while it is being positioned to grasp an object or while it is carrying an object. As a result, such devices lack stability under load and impart a rotational force tending to cause pronation or supination of the forearm which must be overcome by the user.

SUMMARY OF THE INVENTION

It has therefore been among the objectives of the present invention to provide a reaching and gripping device for use by disabled persons which is operative to aid the disabled person in gripping objects with sufficient force to permit lifting of an object independent of the strength in the hand and wrist of the user, which can be triggered by either hand of the user, which relieves the bending stresses on the hand and wrist of the user, which avoids imparting a torsional force to the forearm and wrist of the user when the device is being positioned or is under load, and which can be easily and quickly engaged for use without the need for fastening the device to the arm of the user or for adjusting or tightening it in place.

These objectives are accomplished in a device for reaching and gripping objects which includes a self-capturing and highly accessible forearm brace into which the forearm and hand of the user can be easily and quickly inserted, and which will support the anticipated bending forces directly on the user's forearm. An extension arm having opposed gripper jaws is connected to the forearm brace which is aligned with, or slightly below, the axis of the user's forearm so that the extension arm and gripper jaws can be easily and naturally directed toward the object to be gripped. This positioning of the extension arm with respect to the forearm brace helps avoid rotation of the brace on the user's forearm. A trigger mechanism carried by the forearm brace is linked by a cable to the opposed gripper jaws. The trigger is actuated to move the jaws toward one another to initially grip the object, and to lock the jaws in place. When the object is lifted, tensioning means carried by the forearm brace operate in response to movement of the extension arm to urge the gripper jaws toward one another with a force corresponding to the weight of the object.

More specifically, in the presently preferred embodiment, the extension arm is pivotally attached at one end to the forearm brace and is held against its own weight in a horizontal position by a retention spring. The opposed gripper jaws are attached at the remote end of the extension arm. Preferably, the facing surfaces of the gripper jaws are formed of high friction elastomeric bands which deflect to conform to the surface of the object as they close about it and hold the object by friction against slippage from the grasp of the gripper.

The gripper jaws are actuated to close about an object to be lifted by a cable which extends through the extension arm and links the gripper jaws to a ratchet tightening device. The ratchet tightening device is rotated to tension the cable by operation of the trigger. Even a small amount of force developed by the weak grip of a disabled user is sufficient to depress the trigger and rotate the ratchet mechanism which tensions the cable, and, in turn, closes the gripper jaws around the object.

Closing of the gripper jaws by operation of the trigger places the facing, elastomeric surfaces of the gripper jaws into frictional engagement with the object. At this point, a relatively small inwardly directed gripping force is applied to the object by the gripping jaws, although their elastomeric surfaces deflect and conform to the surface of the object to provide a substantial area of frictional contact therebetween. Additional gripping force is applied to the object as it is lifted upwardly to move it to another location. This is due to the pivotal connection between the extension arm and the forearm brace. The cable is connected to the extension arm so that as the extension arm pivots downwardly by the weight of the object being lifted, the cable is tensioned in direct relation to the weight of the object. In this way, the gripping force applied to the object corresponds to its weight and is assured to be of sufficient force to hold the object while it is lifted.

The invention provides the advantages of a self-gripping device that supplements the otherwise insufficient gripping force of the user. Only the amount of force necessary to deflect the trigger mechanism and initially close the gripper jaws about the surface of the object is required of the user. Once the trigger is depressed and the gripper jaws moved into place, the ratchet mechanism operated by the trigger locks in place. This eliminates the need to maintain a grip on the trigger in order to keep the gripper jaws closed about the object. The gripping force applied by the gripper jaws in the course of lifting an object is provided by the weight of the object itself as the extension arm is lifted by the forearm of the user.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 1 is a side elevational view of a reaching and gripping device of this invention shown in position of the forearm of a user;

FIG. 1a is an end view of the forearm brace of the device taken generally along line 1a—1a of FIG. 1;

FIG. 2 is a partial cut-away view of the gripping and reaching device of FIG. 1 showing the trigger and gripper actuating mechanism;

FIG. 2a is a plan view of the gripper portion of the device of FIG. 2 taken generally along lines 2a—2a of FIG. 2;

FIGS. 3 and 3a are drawings similar to FIGS. 2 and 2a showing the device with the gripper positioned about an object to be lifted, and the trigger and ratchet mechanism advanced to close the gripper about the object; and FIGS. 4 and 4a are drawings similar to FIGS. 2 and 2a showing the weight-responsive mechanism tightening the gripper about the object as the object is lifted.

DETAILED DESCRIPTION OF THE INVENTION

Referring to FIGS. 1 and 1a, the presently preferred embodiment of the reaching device 10 according to the principles of this invention comprises a forearm brace 12, and extension arm 14, and a gripper 16.

The forearm brace 12 includes a forearm-receiving section 22 and a hand-receiving section 24. The sections 22 and 24 are adapted to engage the forearm and the corresponding hand of the user, respectively. The forearm-receiving section 22 is adapted to support the entire weight and bending moment of the device 10, together with any object held by the device, directly upon the forearm of the user between the user's elbow and wrist. The forearm receiving section 22 of the brace 12 comprises a lower forearm support 26 having a cushion pad 34 adapted to engage the user's forearm along its underside against the ulna distally of the user's elbow, and an upper support 28 having a cushioned pad 36 adapted to support the brace 10 against the upper portion of the user's forearm along the radius proximally of the user's wrist. The supports 26, 28 are interconnected by a pair of opposed frame sections 38.

The axially spaced forearm supports 26, 28 provide a point of contact of the brace 12 on opposite sides of the forearm so that the weight of the extension arm 14 and any object to be lifted is carried by the forearm. As viewed in FIGS. 1 and 1a, the bending moment created by the extension arm 14 applies a downwardly directed force at the upper support 28, and an equal and opposite upwardly directed force at the lower support 26 of the forearm receiving section 22. This structure substantially isolates the wrist, hand and fingers from load which is advantageous to those patients with severely weakened joints or musculature in those areas.

In the presently preferred embodiment, the forearm of the user is inserted through an opening 30 formed between the supports 26, 28 of the forearm section 22 such that the longitudinal axis of the forearm aligns with the longitudinal axis 32 of the forearm section 22. This stabilizes the position of the device 10 on the forearm to reduce pronation or supination thereof when an object is picked up, as described below.

A forward frame section 39 extends forwardly from the support 28 and connects the forearm supporting section 22 with the hand-engaging section 24 of the brace 12. The hand-engaging section 24 of the brace 12 includes a housing 40 which contains a mechanism for controlling the operation of the gripper 16. The housing 40 also carries with it means for pivotally connecting the extension arm 14 to the brace 12. These details and features will be described more fully in connection with FIGS. 2-4 described below.

More specifically, the hand-engaging section 24 of the brace 12 includes a handle 42 rigidly secured to the forward end of the forward frame section 39 of the brace 12. This handle 42 extends downwardly and intersects the axis 32 of the brace 12 and provides a means for gripping the brace by engagement of the palm and thumb of the user's hand.

The hand-engaging section 24 of the brace 12 also includes a trigger 44 which is pivotally secured to the brace 12 within the housing 40. The trigger 44 is linked from the housing 40 through the extension arm 14 to the gripper 16 to provide a means for operation of the gripper 16 by the user in a manner described in connection with the figures discussed below. The trigger 44 has a lower extension 45 positioned to extend downwardly from the housing 40 parallel to and forward of the handle 42 near the hand of the user where it can be manipulated by the user's fingers as the user grips the trigger 45 and handle 42 together. The trigger 44 also has an upwardly extending portion 46 which can be operated by the other hand of the user should the user find it desirable or necessary to do so. As described in more detail below, the trigger 44 is movable between a lowered position shown in FIG. 1 and a raised position shown in FIGS. 3 and 4.

A guide handle and support 48 are slidably connected to the extension arm 14 and extend downwardly therefrom. The purpose of the guide handle and support 48 is to enable the user to use his or her other hand to control the position of the extension arm 14, and, in addition, to rest the device 10 on a horizontal surface in a position to grasp an object to be lifted. The guide 48 is slidable on the arm 14 to allow its positioning at various places along its length at the option of the user.

Referring now to FIG. 2, the forward end of the brace 12 is shown. It includes the frame section 39 which rigidly secures the housing section 40 to the arm-engaging portion 22 of the brace 12. Extending downwardly and rigidly secured to the forward end of the frame section 39 of the brace 12 is the handle 42.

Rigidly attached to the end of the extension arm 14 is an arm base 52. The base 52 is pivotally attached to the housing 40 through a pivot pin 54. The base 52 includes an upwardly facing abutment surface 55 which rests against an abutment surface 56 formed in the housing 40. As described below, the abutment surface 56 serves as a stop for limiting movement of the extension arm 14 in an upward direction relative to the housing 40 as viewed in FIG. 2. A biasing spring 57 is connected in tension between the housing 40 at point 58, and a point 59 on the abutment surface 55 of the base 52. The spring 57 is sufficiently stiff so as to hold the arm 14 upwardly against the abutment surface 56 provided no object of significant weight is being carried by the gripper 16. In this position, the arm 14 is held in axial alignment with the center line 32 of the brace and forearm of the user. See FIG. 1.

At the opposite end of the extension arm 14 is the gripper 16 as shown in FIG. 2a. The gripper 16 includes a pair of opposed inwardly facing jaws 60. Each of the jaws 60 has a pair of legs 61, 61a which are interconnected generally perpendicularly to one another in an L-shape. A mounting bar 62 fixed to the leg 61 of each jaw 60 is pivotally attached near its center through a pivot pin 63 to a gripper support bracket 64. The bracket 64 is rigidly secured to the remote end of the extension arm 14. A tension spring 65 is stretched between holes 66 formed in the free end of each support bar 62 which maintains the support bars 62 generally parallel to one another, and, in turn, holds the jaws 60 of the gripper 16 in an open position. See FIG. 2a. Limit pins 68 are located on the bracket 64 which engage the support bars 62 to limit their motion and define the open position of the jaws 60. The spring 65 holds the bars 62 against these pins 68 when the gripper 16 is not actuated.

The actuation of the gripper 16 is accomplished through the gripper linkage 70 carried by the arm 14. The linkage 70 includes a cable 71 which extends along and preferably through the extension arm 14 between the gripper 16 and the housing 40 of the brace 12. The cable 71 is preferably of a material of high elastic coefficient. Metal is suitable; however, a stiff polymer material such as Kevlar ® is preferred. "Kevlar" is a registered trademark of E. I. duPont de Nemours, Co. As shown in FIG. 2a, the cable 71 is terminated at a coupling ring 73 in the region of the bracket 64. Linked to the ring 73 are a pair of hooks or cable sections 75 which connect the cable 71 at eyelets 76 to the inner ends of legs 61 of the L-shaped jaw sections 60. As so configured, tensioning of the cable 71 pulls the free ends of the jaws 60 toward the extension arm bracket 64 causing the jaws 60 to pivot inwardly about the pins 63, toward one another, to grip an object therebetween.

The operation of the mechanism which causes the tensioning of the cable 71 to actuate the gripper 16 is better understood by reference to FIGS. 2, 3 & 4. As shown there, the cable 71 of the linkage 70 extends through the extension arm 14. The cable 71 is guided within the housing 40 about pins 81 and 82 which extend transversely across the housing 40. The cable 71 is further guided about a pair of guide pins 83 and 84 carried by a ratchet tensioning wheel 85 which is rotatably mounted within the housing 40. The cable 71 extends beyond the pin 84 to a guide pin 86 transversely mounted in housing 40, and then is clamped to the housing 40 with a cable-tensioning screw 88 threaded to the housing 40. The screw 88 is provided to adjust the tension of the cable 71 upon the initial assembly of the device 10.

The ratchet wheel 85 has a ring of ratchet teeth 91 on its periphery positioned to engage a ratchet pawl 92. The ratchet pawl 92 is carried by a ratchet release lever 93 pivotally connected at its end 94 to the housing 40. The end 94 in the embodiment shown is attached through the same pin which serves as guide pin 82. The ratchet pawl 92 on the ratchet release lever 93 is spring biased against the ratchet teeth 91 on the wheel 85 by a tensioning spring 95. The spring 95 is connected from the lever 93 to the housing 40 at point 96.

The trigger 44 extends beyond the ratchet wheel 85 and is slidably mounted thereto. The trigger 44 is held in place by a spring detent 97 carried within the wheel 85. The detent 97 snap fits into one of two notches 98 and 99 in the trigger 44 to allow the trigger to slide to either of two positions. In its lowered position shown in the Figs., the trigger 44 is easily operable by the fingers of the user with the hand inserted in the brace 12. The lower portion of the trigger 45 in this position falls within the grip of the user. When the detent 97 is engaged with the notch 99 and the trigger 44 is in the raised position (not shown), the upper portion 46 of the trigger 44 extends above the brace 12 so as to be more readily accessible for use with the other hand of the user should that be desired.

Operation of the trigger 44 causes a rotation, counterclockwise in FIGS. 2-4, of the ratchet wheel 85. This causes the notches 91 to advance against the ratchet pawl 92 and lock the ratchet wheel 85 in the position to which it is advanced by operation of the trigger 44 by the user. Rotation of the ratchet wheel 85 causes a rotation of guide pins 83 and 84 with the wheel 85 so as to lengthen the path of the cable 71 and thereby tension the cable, pulling it through the extension arm 14 toward the housing 40.

Referring now to FIG. 3a, the effect of the tensioning of the cable by operation of the trigger 44 is shown. As the cable 71 is tensioned by the operation of the trigger 44, the remote end of cable 71 moves into the extension arm 14 carrying with it the ring 73 and thus pulling the two links 75. In turn, the support brackets 64 are pivoted outwardly relative to the limit pins 68 which moves the jaws 60 of the gripper 16 toward one another. Depending on the force which the user is capable of applying to the trigger 44, the jaws 60 close together with a gripping force which corresponds in magnitude to the amount of resulting tension in cable 71.

Preferably, each of the jaws 60 includes an inwardly facing contact surface 101 which is formed on an elastomeric band 103 which encircle each of the jaws 60 and span the open faces 104 of the L-shaped jaws 60. As tension in the cable 71 is increased and the jaws 60 pivot further inwardly, the bands 104 deform into the jaws 60 and wrap about the object 102 to increase the contact area between the friction surface 101 of the bands 103 and the object 102.

In operating the gripper 16 in this manner with the trigger 44, it is only necessary for the user to bring the surface 101 into contact with the object 102 a nominal amount. Tightening of the gripper 16 about the object 102 is accomplished by a cable-tensioning mechanism contained within the housing 40.

Referring now to FIG. 4, as the device 10 is lifted, the weight of the object 102 within the gripper 16 imparts sufficient frictional force to the band 103 to cause a downward pivoting of the extension arm 14 about the pivot pin 54. This occurs as the weight of the object 102 overcomes the tension in the spring 57. As the extension arm 14 pivots downwardly, the base 52 moves away from the stop 56, and the entire block 52 pivots away from the guide pin 81. This movement pulls the cable 71 about the guide pin 82 which draws the cable 71 through the extension arm 14 away from the gripper 16.

Referring to FIG. 4a, it is seen that the additional tensioning of the cable 71 further draws the gripper jaws 60 against the object 102 and stretches the elastomeric bands 103 more tightly about the surface of the object 102. The greater the weight of the object 102, the greater the downward deflection of the extension arm 14; in turn, the tension applied to cable 71 is increased and the gripper jaws 60 are pivoted toward one another with a corresponding force.

As long as the object 102 is lifted, the tension in the cable 71 will remain sufficient to keep the gripper 16 closed about the object 102, preventing it from being dropped. This will be true even if the ratchet is accidentally released. Once the object 102 is placed upon the receiving surface and its weight is shifted to that surface from the extension arm 14, the grippers 16 partially open and return to the position shown in FIG. 3a. At this point, a downward movement of the ratchet pawl 92, caused by a rotation of the lever 93 with the thumb of the user, releases the ratchet and allow the ratchet wheel 85 to return to its original position. In turn, the tension in the cable 71 is released permitting the gripper 16 to return to the position shown in FIG. 2a for release of the object.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

What is claimed is:

1. Apparatus for aiding a user having wrist or grip disability in reaching and gripping an object, comprising:
   a forearm brace adapted to mount on the forearm of the user;
   an extension arm mounted to said forearm brace;
   a gripper means mounted to said extension arm, said gripper means having opposed gripping elements movable toward and away from one another;
   trigger means for initially moving said opposed gripping elements toward one another into contact with an object located therebetween to permit lifting of the object;
   actuating means operable in response to lifting of the object to urge said gripping elements against the object located therebetween with a gripping force proportional to the weight of the object.

2. The apparatus of claim 1 in which said forearm brace comprises:
   a first pad adapted to contact the radial portion of the forearm of the user proximally of the wrist;
   a second pad adapted to contact the ulnar portion of the forearm of the user distally of the elbow;
   opposed arms interconnecting said first pad and said second pad so that upon insertion of said hand and forearm between said first and second pads the longitudinal axis of the forearm is substantially coincident with the longitudinal axis of said extension arm.

3. The apparatus of claim 1 in which said gripping elements each include an object gripping, inner surface formed of a deflectable, elastic material having a relatively high coefficient of friction, said inner surfaces of said gripping elements being adapted to deflect upon contact with an object to conform to the shape of the object.

4. The apparatus of claim 1 in which said actuating means comprises:
   means for pivotally mounting said extension arm to said forearm brace;
   a cable carried by said extension arm, said cable being fixedly mounted at one end to said forearm brace and mounted at the other end to each of said opposed gripping elements;
   said trigger means being connected to said cable for initially tensioning said cable to move said gripping elements toward one another about an object located therebetween;
   guide means mounted to said forearm brace for carrying said cable between said extension arm and said one end of said cable fixed to said forearm brace, said extension arm being pivoted with respect to said forearm brace in proportion to the weight of the object being lifted so that said cable is tensioned about said guide means by said extension arm to urge said gripping elements against the object with a gripping force proportional to the weight of the object.

5. The apparatus of claim 4 in which said means for pivotally mounting said extension arm to said forearm brace comprises a pin, a stop mounted to said forearm brace and engageable with said extension arm to limit pivotal motion thereof, and a spring carried by said forearm brace and connected to said extension arm for biasing said extension arm against said stop.

6. The apparatus of claim 4 in which said guide means comprises at least one pin mounted to said forearm brace between said extension arm and said fixed end of said cable, said cable being directed around said pin.

7. Apparatus for aiding a user having wrist or grip disability in reaching and gripping an object, comprising:
   a forearm brace adapted to mount on the forearm of the user;
   an extension arm having opposed ends, one end of said extension arm being pivotally mounted to said forearm brace;
   gripper means mounted to the other end of said extension arm, said gripper means having opposed gripping elements movable toward and away from one another;

cable means carried by said extension arm and connected between said gripping elements and said forearm brace;

trigger means mounted to said forearm brace and linked by said cable means to initially said gripper means, said trigger means being operable to tension said cable means and thereby move said gripping elements toward one another to close about an object located therebetween, said forearm brace and said extension arm thereafter being movable to lift the object held between said opposed gripping elements;

tensioning means operative in response to further lifting of the object to tension said cable means and urge said opposed gripping elements against the object therebetween with a force proportional to the weight of the object.

8. The apparatus of claim 7 in which said trigger means includes an operating lever slidable between a first position for operation by one hand of the user, and a second position for operation by the other hand of the user.

9. The apparatus of claim 7 in which said trigger means includes:
   a ratchet mechanism connected to said cable means;
   a trigger connected to said ratchet mechanism, said ratchet mechanism being rotatable to tension said cable means in response to movement of said trigger by the user; and
   means for releasably locking said ratchet mechanism in a fixed position to hold tension on said cable means while releasing said trigger.

* * * * *

UNITED STATES PATENT AND TRADEMARK OFFICE
CERTIFICATE OF CORRECTION

PATENT NO. : 4,758,035
DATED : July 19, 1988
INVENTOR(S) : Kevin W. Shimasaki

It is certified that error appears in the above-identified patent and that said Letters Patent is hereby corrected as shown below:

In column 1, line 49, the first occurrence of "of" should be --to--.

In column 3, line 33, the second occurrence of "of" should be --on--.

In column 9, line 5, delete "initially".

In column 9, line 6, after "to", insert --initially--.

In column 9, line 13, delete "further".

In column 9, line 14, after "to", insert --further--.

Signed and Sealed this

Seventeenth Day of January, 1989

Attest:

DONALD J. QUIGG

*Attesting Officer*  *Commissioner of Patents and Trademarks*